United States Patent [19]

Binning

[11] Patent Number: 5,435,690
[45] Date of Patent: Jul. 25, 1995

[54] METHOD AND APPARATUS FOR LOADING LAYERS OF ARTICLES

[75] Inventor: Ronald L. Binning, Hampton, Va.

[73] Assignee: IDAB Incorporated, Hialeah, Fla.

[21] Appl. No.: 91,597

[22] Filed: Jul. 15, 1993

[51] Int. Cl.[6] .................. B65G 57/03; B65G 57/24; B65H 29/38; B65H 29/50
[52] U.S. Cl. .................. 414/791.6; 414/794.3
[58] Field of Search .............. 414/794.3, 794.4, 791.6; 198/418.5, 429

[56] References Cited

U.S. PATENT DOCUMENTS

| 3,331,516 | 7/1967 | Gubeli | 414/789.1 |
|---|---|---|---|
| 3,593,624 | 7/1971 | Dufour | 414/788.3 |
| 3,617,055 | 11/1971 | Stahl | 271/218 |
| 3,637,095 | 1/1972 | Kampfer | 414/331 |
| 4,067,457 | 1/1978 | Schiepe | 414/791.6 X |
| 4,162,733 | 7/1979 | Wiseman | 414/790.4 |
| 4,575,988 | 3/1986 | Meier | 53/399 |
| 4,610,593 | 9/1986 | Voss et al. | 414/790.7 |
| 4,621,969 | 11/1986 | Berghall et al. | 414/331 |
| 4,623,291 | 11/1986 | Buck | 414/794.3 X |
| 4,886,265 | 12/1989 | Wetter | 271/279 |
| 4,898,511 | 2/1990 | Rossig et al. | 414/792.6 |
| 4,902,195 | 2/1990 | Lucas | 414/794.3 X |
| 4,966,521 | 10/1990 | Frye et al. | 414/788.8 |
| 5,024,576 | 6/1991 | Meschi | 414/786 |
| 5,135,102 | 8/1992 | Sjorgren et al. | 198/468.6 |
| 5,181,820 | 1/1993 | Sjogren et al. | 414/331 |

FOREIGN PATENT DOCUMENTS

| 0375849 | 7/1990 | European Pat. Off. . | |
| 2407155 | 6/1979 | France | 414/794.3 |
| 3536541 | 4/1987 | Germany | 414/794.3 |
| 55-2546 | 1/1980 | Japan | 414/794.3 |

OTHER PUBLICATIONS

Cannon Equipment Co. brochure, "Carts & Automated Loaders Cut Newspaper Distribution Costs", 4 pgs (undated).

Primary Examiner—Andres Kashnikow
Assistant Examiner—Lesley D. Morris
Attorney, Agent, or Firm—Finnegan, Henderson, Farabow, Garrett & Dunner

[57] ABSTRACT

A cart loader for loading successive layers of articles on a loading surface of a cart includes an elevating conveyor for positioning a discharge end at a selected discharge elevation. A support extends from the discharge end to position the layer of articles over the loading surface. Retracting the support from beneath the layer deposits the layer of articles on the cart.

44 Claims, 5 Drawing Sheets

METHOD AND APPARATUS FOR LOADING LAYERS OF ARTICLES

BACKGROUND OF THE INVENTION

1. Field of the Invention

The present invention generally relates to a method and apparatus for arranging articles into an array to form a layer and loading layers of articles. The invention particularly relates to a method and apparatus for loading a cart with layers formed from an array of bundled signatures.

2. Discussion of the Related Art

The timely circulation of daily newspapers or other signatures requires that every operation from printing of the signatures to distribution be performed quickly and efficiently. Accordingly, loading and shipping signatures to distributors must be performed quickly and efficiently without damaging the signatures.

After printing, a stacker stacks individual signatures into vertical piles which are then secured with string to form a bundle. A conveyor carries the bundles to a loading station where the bundles are then loaded onto carts, pallets, trucks, or other shipping containers.

Each bundle is approximately eleven inches in width and fourteen inches in length with a height ranging from three to eighteen inches, and an average height of ten inches. Typical carts have an effective loading height of sixty inches and have a loading surface which can support a 2×2 layer of bundles. Thus, if the bundles are ten inches in height, a cart can handle 24 bundles.

Cart loading was originally performed manually. Laborers positioned at a loading station adjacent the conveyor lifted the individual bundles from the conveyor and placed them on carts, pallets, trucks, or other shipping containers.

Automated cart loading systems have been developed, but still lack optimum overall system efficiency.

SUMMARY OF THE INVENTION

The present invention is directed to a cart loader that overcomes various problems previously experienced with other cart loaders.

Additional features and advantages of the invention will be set forth in the description which follows, and in part will be apparent from the description, or may be learned by practice of the invention. The objectives and other advantages of the invention will be realized and attained by the process and apparatus particularly pointed out in the written description and claims as well as the appended drawings.

To achieve these and other advantages and in accordance with the purpose of an aspect of the invention, as embodied and broadly described, the invention includes a method and apparatus for loading layers of articles on a loading surface by positioning a discharge end of a conveyor at a selected discharge elevation, conveying a layer of articles on a conveying surface of the conveyor to the discharge end, extending a support from the discharge end of the conveyor, transferring the layer from the conveying surface of the conveyor onto the support, and removing the layer from the support to deposit the layer on the loading surface.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

DETAILED DESCRIPTION

Reference will now be made in detail to the present preferred embodiment of the invention, an example of which is illustrated in the accompanying drawings.

Figure 1:
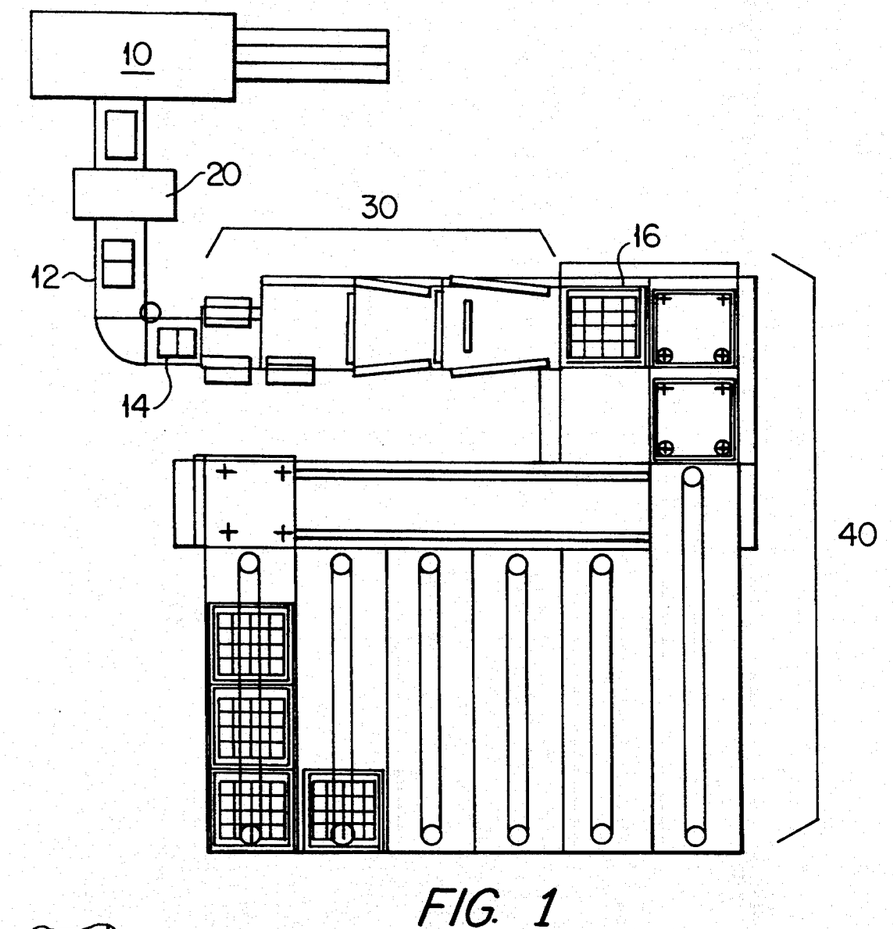
FIG. 1 is a schematic of a signature stacking and loading system incorporating the cart loader of the present invention.

FIG. 1 illustrates a system which stacks, bundles, and loads signatures on carts. The system generally includes a stacker 10, a tyer 20, a cart loader 30, and a cart handling station 40. An infeed conveyor 12 transports bundles from the stacker 10 to the tyer 20 and cart loader 30. The stacker 10 stacks a predetermined number of individual signatures into bundles 14. The tyer 20 then secures the bundles with string or any other well-known fastening material. The infeed conveyor 12 carries the bundles to the cart loader 30 which then forms the bundles 14 into layers and loads the layers on carts 16 positioned at a loading position by the cart handling station 40. Upon loading of a cart 16, the cart handling station 40 removes the full cart and positions an empty cart at the loading position for loading by the cart loader 30.

Figure 6A:
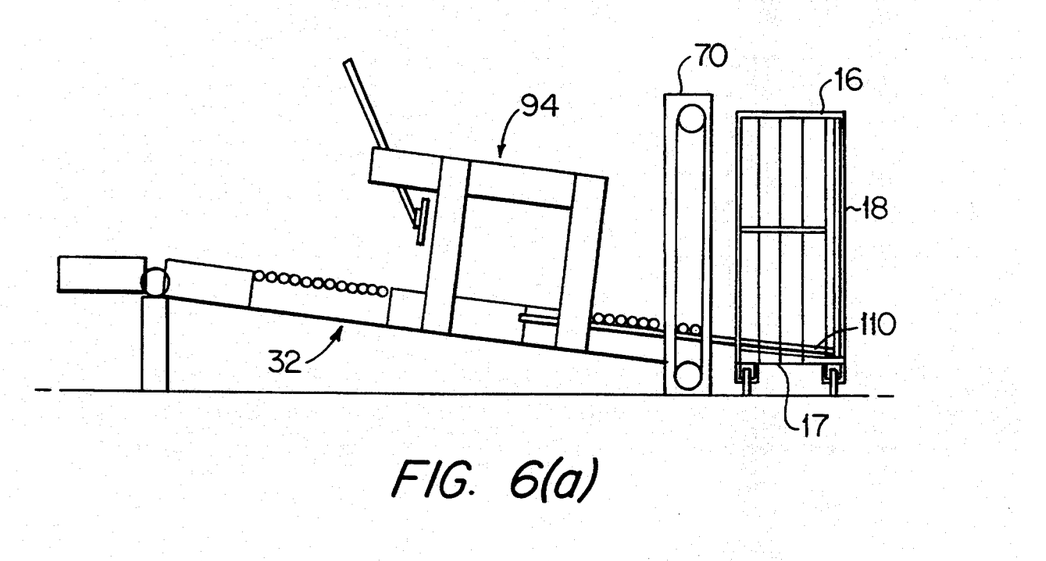
FIGS. 6(a) and 6(b) are partial side views of the cart loader of FIG. 2.
Figure 6B:
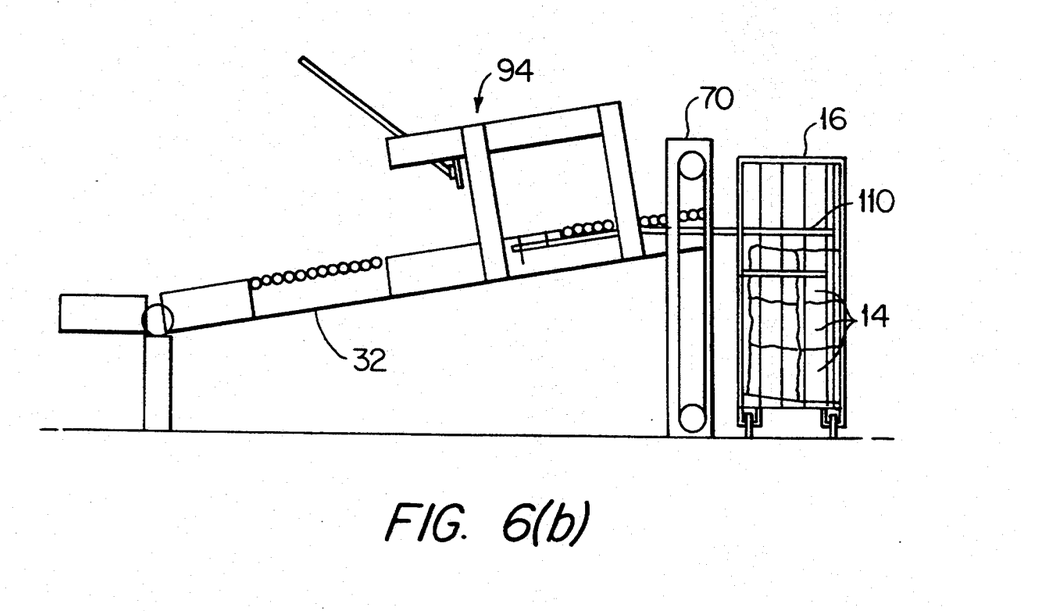

The carts 16 include a bottom loading surface 17 and walls, including rear wall 18, surrounding a portion of the bottom loading surface 17 for laterally supporting the bundles 14. The bottom loading surface 17 and walls of the cart 16 may be composed of a metal plate, spaced rods, a perforated sheet, or any other well-known structure for supporting the bundles. The cart loader 30 loads bundles onto the cart 16 through an open side of the cart, which may then be covered with doors or straps. As shown in FIGS. 6(a) and (b), the bottom loading surface 17 of the cart 16 is generally sloped to urge bundles 14 against the rear side wall 18 of the cart for added stability during loading.

Figure 2:
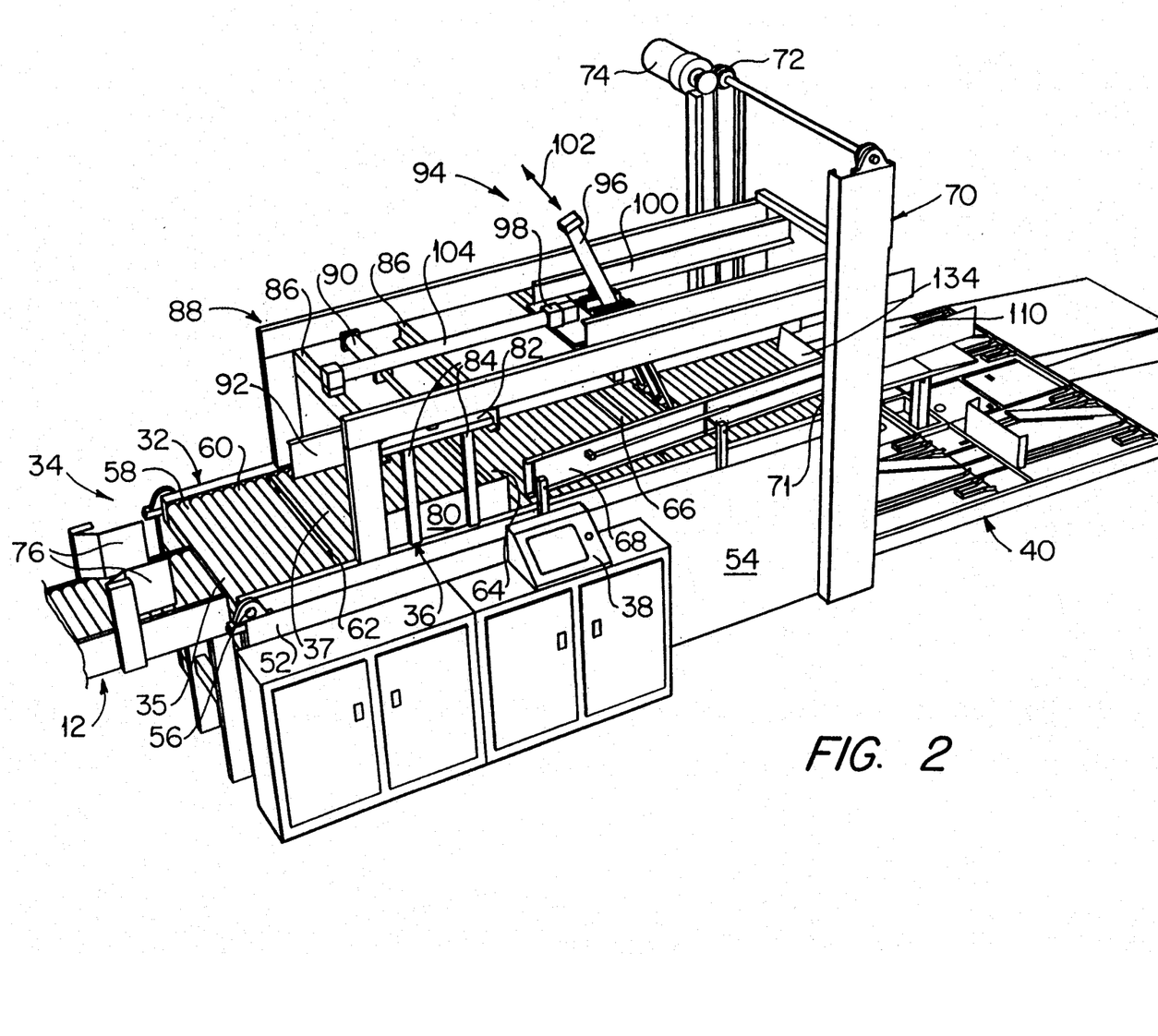
FIG. 2 is a perspective view of the cart loader of the present invention.

As shown in FIG. 2, the cart loader 30 in general preferably includes an elevating conveyor 32 having an infeed section 35 flexibly coupled to the infeed conveyor 12, a bundle pacer 34 at the infeed section 35 of the elevating conveyor 32, and a layer forming apparatus 36 adjacent the bundle pacer 34. A controller such as a CPU or programmable logic controller (PLC) (not shown) synchronizes the operation of each component to efficiently load carts with bundle layers. A controller interface, such as a monitor 38, allows an operator to adapt the controller according to the specific application. One such controller which may be used is the SLC 500 PLC made by Allen-Bradley.

The elevating conveyor 32 includes a frame 52 having an infeed end pivotally attached to a base housing 54 at a pivot point 56. The frame 52 of the elevating conveyor supports a conveying surface 58 preferably composed of several sections of chain-driven live rollers 60. Each roller 60 of the section includes a sprocket. A chain coupled to each sprocket of the roller section rotates the rollers in response to the controller. Alternatively, each roller may include two sprockets with chains connecting adjacent rollers, such as a chain-to-chain roller configuration. The conveying surface 58 may also include one or more belt conveyors, slat conveyors, or an accumulating conveyor.

The conveying surface 58 preferably is wide enough to support at least two bundles side-by-side. Flexibly coupling the infeed section 35 of the conveyor 32 to the infeed conveyor 12 compensates for changes in elevation between the infeed conveyor 12 and elevating conveyor 32 when the elevating conveyor 32 is inclined or declined.

Figure 3:
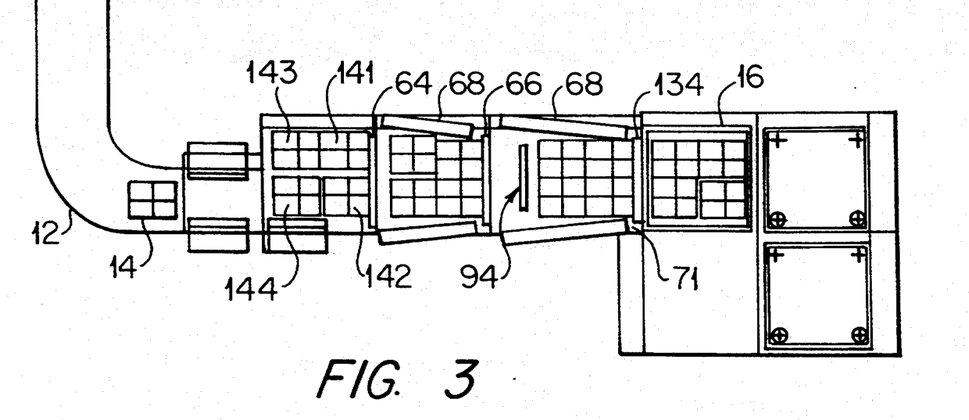
FIG. 3 is a cut-away top plan view of the cart loader shown in FIG. 2.

As shown in FIGS. 2 and 3, retractable stop plates 62, 64, 66, preferably positioned between the sections of chain-driven live rollers 60 may be moved generally upward in a direction perpendicular to the conveying surface 58 in response to the controller. This causes the plates to block and halt movement of the bundle layers. Inwardly slanting guides 68 are preferably mounted on the frame 52 to urge the individual bundles into a tight layer.

A vertical lifting mast 70 supports a discharge end 71 of the conveyor frame 52 for vertically positioning the discharge end 71 relative to the loading surface 17 of a cart 16. The lifting mast includes a chain lift mechanism 72 coupled to the discharge end of the frame 52. A motor 74, in response to a signal from the controller, drives the chain lift 72 to elevate the discharge end 71. Alternatively, the lift mechanism may include a scissors lift, screw jack lift, or hydraulic lift.

The bundle pacer 34 receives bundles 14 from the infeed conveyor 12 and controls the speed of the bundles 14 entering the cart loader 30, allowing the layer forming apparatus 36 adequate time to divert alternating bundles into a layer. As shown in FIGS. 2 and 3, the bundle pacer 34 includes the short infeed conveyor section 35 and side plates 76 mounted near the end of the infeed conveyor 12. The side plates 76 minimize lateral movement of the bundles as they enter the cart loader 30. The conveyor section 35 may be composed of a section of chain-driven live rollers 60, as shown, or a short belt conveyor. Stop plate 62 is positioned between the conveyor section 35 of the bundle pacer 34 and a conveyor section 37 of the layer forming apparatus 36. The stop plate 62 is used to halt movement of the bundles while the layer forming apparatus 36 diverts previously-conveyed bundles into a layer.

The layer forming apparatus 36 is positioned on the elevating conveyor 32 between the bundle pacer 34 and stop plate 64 and includes a side plate 80 attached to a horizontal bar 82 by vertical members 84. Opposing guide rails 86 mounted on an overhead frame 88 attached to conveyor frame 52 define a track for the horizontal bar 82 to follow. An air cylinder 90 having one end attached to the overhead frame 88 and an opposite end attached to the horizontal bar 82 communicates with the controller to move the horizontal bar along the opposing guide rails 86, thus moving side plate 80 in a direction transverse to the conveying direction of the bundles. Alternatively, guides (not shown) controllable by the controller can be positioned on the conveying surface 58 to steer the bundles laterally with respect to the conveying direction.

The layer forming apparatus 36 receives a bundle from the bundle pacer 34 and the side plate 80 diverts selected bundles against a side wall 92 mounted on the frame 52 of the cart loader 30. The diverted bundles are then conveyed in the original conveying direction until hitting stop plate 64. Bundles not diverted by the side plate 80 are conveyed in the conveying direction until hitting stop plate 64. In this manner, a desired array of bundles can be formed.

For example, as shown in FIG. 3, the layer forming apparatus 36 forms a 2×2 array of bundles by diverting a first bundle 141 against the side wall 92. The conveyor 32 then conveys the first bundle 141 until it reaches the stop plate 64. The layer forming apparatus 36 then receives a second bundle 142 but does not divert it, allowing the second bundle 142 to proceed in the original conveying direction until it hits the stop plate 64 alongside the first bundle 141. The layer forming apparatus 36 then diverts the third bundle 143 against the side wall 92 so that the third bundle 143 is directly behind the first bundle 141. A fourth bundle 144 entering the layer forming apparatus 36 is conveyed until it is directly behind the second bundle 142, thus forming a 2×2 array of bundles. Alternatively, the layer forming apparatus may divert consecutively conveyed bundles (e.g., bundles 141, 142) simultaneously to form the array. Various other arrays may be similarly formed.

Once a bundle layer is formed, the controller lowers stop plate 64, allowing the bundle layer to proceed on the elevating conveyor 32. Stop plate 66 halts movement of the layer if a previously-conveyed layer is being loaded on the cart 16.

As shown in FIG. 2, the cart loader 30 preferably includes a layer pusher 94 between stop plate 66 and the discharge end 71 for assisting the conveyor 32 in transporting the bundles to the discharge end 71 and loading the bundles on the cart 16. The layer pusher 94 includes an air cylinder-driven push-plate 96 mounted to a movable rack 98 supported by opposing guides 100 attached to the overhead frame 88. The push-plate 96 extends in the direction noted by arrow 102 to support the rear of the bundle layer. Another air cylinder 104 then drives the rack 98 in the conveying direction, moving the bundle layer to the discharge end 71 of the conveyor. The push-plate 96 gives the reach to push the bundles into the cart 16.

To assist in the loading of layers on the cart 16, the elevating conveyor 32 preferably includes a support 110 extendible from the discharge end 71 of the conveyor 32 for positioning the bundle layers over the loading surface 17 of a cart 16. Retracting the support 110 from beneath the bundle layer deposits the layer on the loading surface 17. The support preferably is a thin plate preferably composed of a low-friction material, such as stainless steel, to prevent tearing of the signatures when the support 110 is retracted from below the bundle layer. Alternatively, the support 110 may include a frame having spaced rods or a perforated sheet.

Figure 4A:
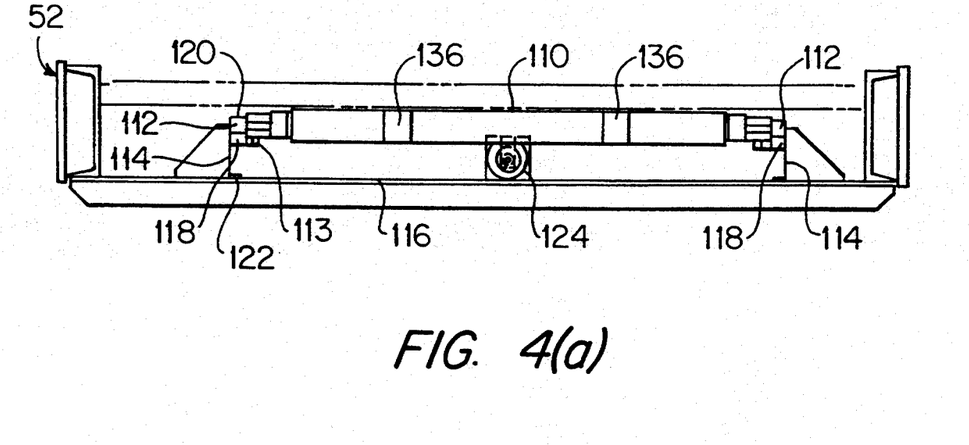
FIGS. 4(a) and 4(b) are front end and top plan views of a layer support of the cart loader.
Figure 4B:
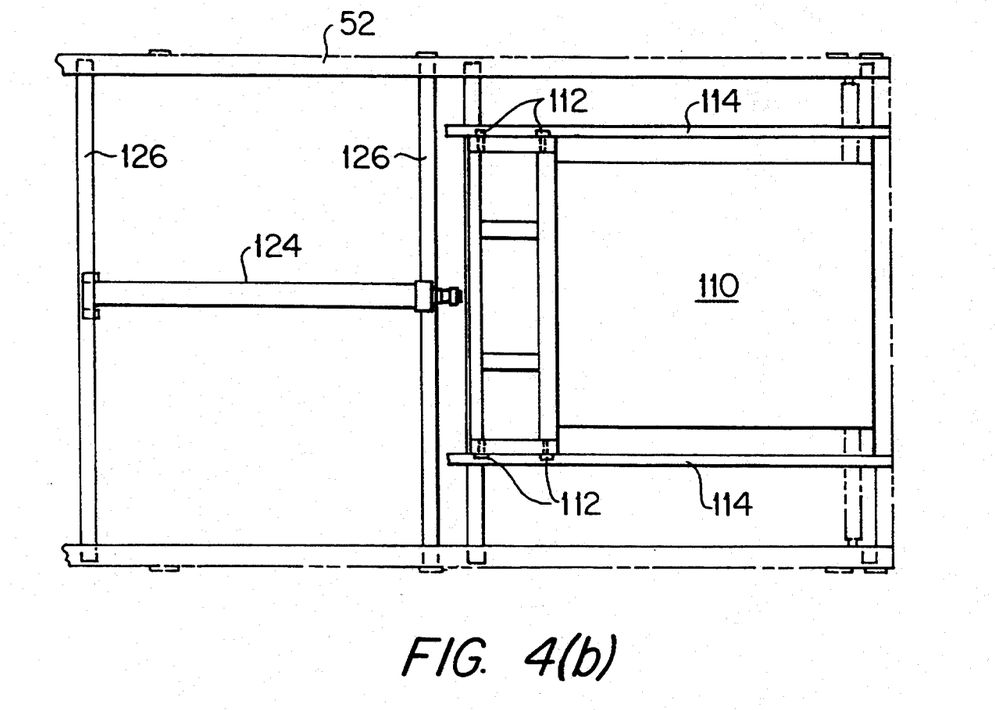

The support 110 is moveably attached to the conveyor frame 52 below the conveying surface in the following manner. As shown in FIGS. 4(a) and 4(b), a pair of rollers 112 are attached to each lateral side of the support 110 near the rear of the support 110. Opposing U-brackets 114 are mounted to a lateral section 116 of the conveyor frame 52. A rail 118 is pivotally attached between an upper flange 120 and a lower flange 122 of each U-bracket 114. The pair of rollers 112 are positioned between the upper flange 120 of each U-bracket 114 and a top surface of each rail 118, which define a track in which the pair of rollers 112 follow. The support may also include a second pair of rollers 113 for following inwardly facing sides of the rail 118 to stabilize lateral movement of the support 110 when extended and retracted.

An air cylinder 124, also attached below the conveying surface 58 with bars 126 mounted to the sides of the frame 52, as shown in FIG. 4(b), connects to the rear of the support 110 to extend and retract the support 110 from the discharge end 71 of the conveyor 32. The air cylinder 124 extends the support 110 in the conveying direction when a bundle layer reaches the discharge end 71 of the conveyor. The support 110 is preferably extended at the same speed the layers are conveyed on the conveying surface 58. Controlling the timing and speed of extending the support 110 minimizes relative motion between the support 110 and the bundle layers, thus reducing the likelihood of tearing the signatures. Making the support 110 from a low friction material also minimizes tearing, thus allowing the support 110 to be partially or fully extended when the bundle layer reaches the discharge end 71 of the conveyor 32.

Pivoting the rail 118 controls the orientation of the support 110 relative to the discharge end 71 of the conveyor 32. As shown in FIGS. 5(a)-(d), the front bottom end of each rail 118 includes an inclined cam surface 128. Fluid cylinders 130 are mounted on the lateral section 116 of the frame 52 near the discharge end 71 between the rail 118 and the lower flange 122 of the U-bracket 114. The cylinders 130 include a cam follower 132 attached to the extending piston.

Figure 5A:
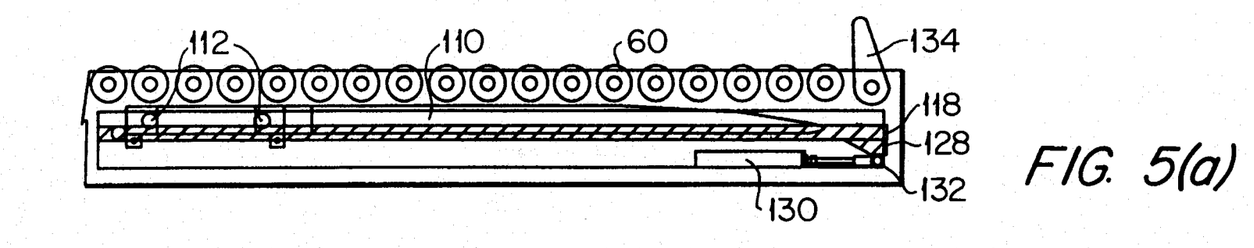
FIGS. 5(a)–(d) are diagrams illustrating the movement of the layer support of FIGS. 4(a)–(b).
Figure 5B:
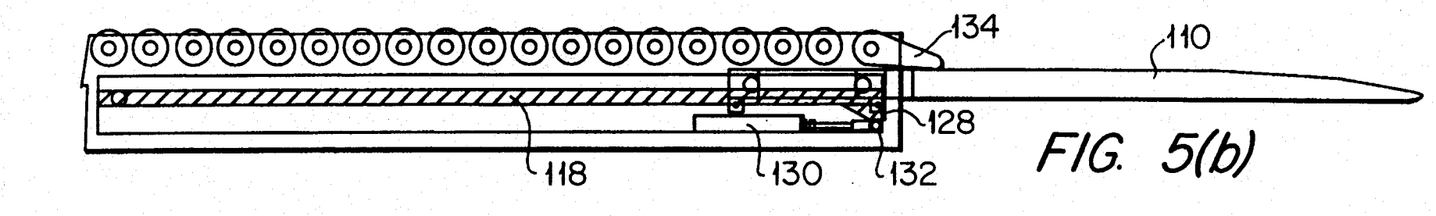

As shown in FIGS. 5(a)-(b), when the fluid cylinder 130 extends the cam follower 132 so that it is below the end of the rail 118, the top surface of the rail 118 and the upper flange 120 of U-bracket 114 are parallel to each other, thus causing the support 110 to extend and retract parallel to the conveying surface 58 of the conveyor 32. As the cylinder 130 retracts the cam follower 132 so that it follows the inclined cam surface 128 of the rail 118, the rail 118 pivots downward, thus widening the track in which the rollers 112 follow. The support can be continuously adjustable by positioning the cam follower 132 anywhere along the inclined cam surface 128. The support can also be adjustable in only two positions (tilted or parallel) by either positioning the cam follower 132 below the end of the rail 118 (parallel position) or retracting the cam follower 132 so that it does not contact the inclined surface 128 (tilted position).

Figure 5C:
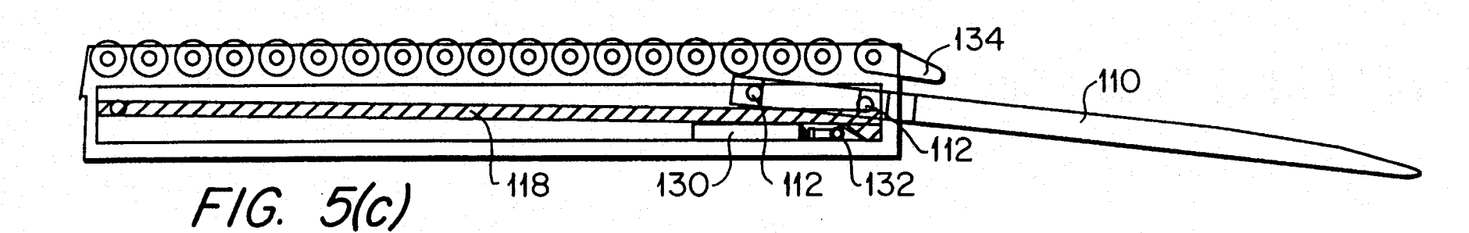
Figure 5D:
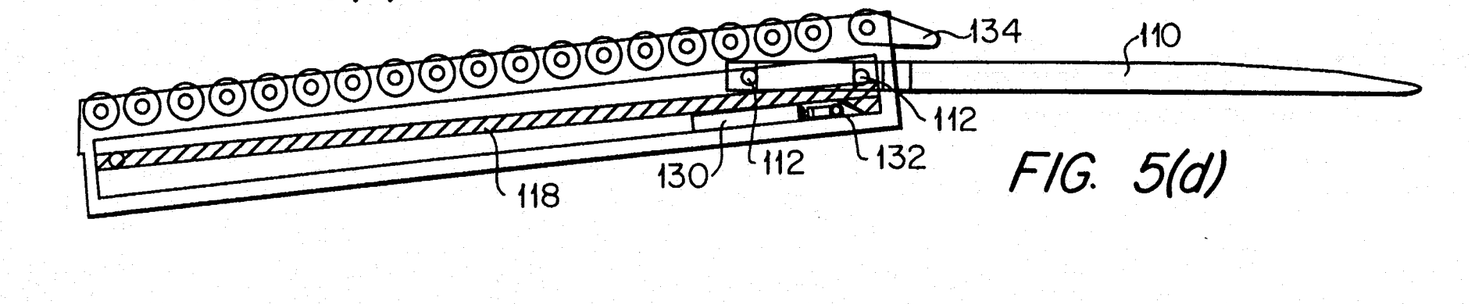

As shown in FIGS. 5(c)-(d), as the rollers 112 approach the discharge end 71, the front roller of the pair rides on the top surface of the rail 118 while the rear roller follows the upper flange 120 of the U-bracket 114. As a result, the support 110 tilts downward with respect to the conveying surface 58. Therefore, the support 110 can be tilted to remain substantially parallel to the loading surface 17 of the cart (or top of a previously-loaded layer) when the discharge end 71 of the conveyor 32 is inclined, as shown in FIG. 5(d).

To facilitate transfer of the bundle layer from the conveying surface 58 to the support 110, a stop member 134 is pivotally attached to the discharge end 71 of the conveyor 32. The stop member 134 is a steel shaft with a plate-like protrusion formed on its peripheral surface, as shown in FIG. 5(a). A bell crank arrangement (not shown), including an arm and air cylinder, is coupled to the stop member 134 and, responsive to the controller, pivots the stop member to the desired position.

When positioned perpendicular to the conveying surface 58, as shown in FIG. 5(a), the stop plate 134 prevents the bundle layer from being transferred to the support 110. When the controller determines that the bundle layer is ready to be transferred to the support 110, the stop plate 134 pivots downward, contacting the support 110, as shown in FIG. 5(b). If the conveyor 32 is inclined and/or the support 110 is pivoted downward, the stop plate 134 acts as a bridge to compensate for the height differential between the discharge end 71 and the support 110, as shown in FIGS. 5(c)-(d).

Once a bundle layer has been loaded, the controller directs the lifting mast 71 to elevate the discharge end 71 of the conveyor 32 to a selected discharge elevation which generally corresponds to the top of a previously-loaded layer of bundles. The elevating conveyor 32 preferably inclines about ten degrees (from a horizontal orientation) and declines about seven degrees to reach all loading levels in the cart. When the conveyor 32 is declined seven degrees, the conveying surface of the conveyor is aligned with the sloped bottom loading surface 17 of the cart, as shown in FIG. 6(a).

The controller determines the selected discharge elevation based on signals from a pair of sensors 136, which may include photocells, mounted on the front edge of the support 110 facing the cart 16, as shown in FIG. 4(a). As the discharge end 71 is elevated, the sensors 136 detect the presence of the previously-loaded bundle layer. When the sensors 136 detect the top of the previously-loaded bundle layer, they emit a signal to the controller which stops the lifting of the discharge end 71. A bundle layer is then loaded on top of the previously-loaded layer, as shown in FIG. 6(b).

Alternatively, the controller can direct the lifting mast 70 to elevate the discharge end 71 a predetermined height after each bundle layer is loaded. The predetermined height would correspond to the height of the bundle layers, as measured by an operator.

In another alternative, an encoder feedback to the controller can control the vertical position of the lift. The conveyor will raise above the last layer height and extend the support 110. The conveyor 32 will then lower the support 110 to the last layer height. When the support 110 touches the last layer it will pivot slightly upward, actuating a sensor. That will locate the previous layer, determine the minimum clearance for transferring the bundles, and instruct the controller where to anticipate the next top of a layer.

The following description illustrates the cart loader 30 loading a cart 16 with a 2×2 bundle layer. The loading process begins with an empty cart at the loading position and the conveyor 32 declined to align the conveying surface 58 with the loading surface 17 of the cart, as shown in FIG. 6(a).

The cart loader 30 receives bundles from the infeed conveyor 12, properly oriented for the cart to be loaded. The bundle pacer 34 controls the entry of bundles on the cart loader 30 and the layer forming apparatus 36 diverts alternating bundles to form a 2×2 layer. Stop plate 64 lowers and the layer advances through side guides 68 to stop plate 66. The controller then raises stop plate 64 for forming the next bundle layer. Stop plate 66 lowers and the layer advances to stop member 134 where it is held until the controller determines that the elevation is correct and the cart is in the correct position. Stop member 134 then lowers and the layer pusher 94 pushes the layer onto the extending support 110, which extends for the layer until it is over the loading surface. The support 110 then retracts from under the layer held by the layer pusher 94, depositing the bundles on top of the loading surface 17 of the cart 16.

The controller then directs the lifting mast 70 to elevate the discharge end 71 of the conveyor 32 until sensors 136 detect the top of the previously-loaded layer. During lifting, the conveying surface 58 advances another bundle layer to the discharge end 71 of the conveyor. Stop member 134 pivots to a position perpendicular to the conveying surface 58 to halt the bundle layer until the discharge end 71 is correctly positioned.

When the controller determines that the height of the discharge end 71 corresponds to the top of the previously-loaded layer, stop member 134 pivots downward to a bridge position, the support 110 extends, and the layer pusher 94 pushes the bundle layer on the support 110. Depending on the inclination of the discharge end 71, the air cylinder 130/cam arrangement 128, 132 may tilt the support 110 so that the support 110 is substantially parallel to the loading surface, which is the top of the previously-loaded layer.

The support 110 then retracts while the layer pusher 94 holds the layer, thus depositing the layer on top of the previously-loaded layer. The cycle then repeats by lifting the conveyor 32 to the top of the previously-loaded layer, extending the support 110 and next layer, and transferring the layer from the support 110 to the top of the previously-loaded layer until filling the cart 16. Since a cart 16 is typically sixty inches in height and bundles average ten inches in height, the cycle is performed six times.

The cart loader not only can load carts, but also can load pallets, trucks, and other well-known bundle containers. The articles which can be loaded are also not limited to signature bundles and can include, for example, boxed or packaged articles.

Additionally, the cart can load unsecured stacks of signatures, thus eliminating the need for a tyer. Under this condition, the height of each bundle or stack of signatures will generally be smaller than secured bundles. Belt conveyors or roller conveyors with small spacings between each of the rollers would preferably be used to minimize any undesirable movement which would tip the stacks over during transport by the conveyor.

It will be apparent to those skilled in the art that various modifications and variations can be made in the cart loader of the present invention without departing from the spirit or scope of the invention. Thus, it is intended that the present invention cover the modifications and variations of this invention provided they come within the scope of the appended claims and their equivalents.

What is claimed is:

1. A method of loading layers of articles on a loading surface, comprising the steps of:
    positioning a discharge end of a conveyor at a selected discharge elevation;
    conveying a layer of articles on a conveying surface of the conveyor to the discharge end;
    extending a support from the discharge end of the conveyor generally in the direction in which the articles are conveyed by the conveying surface;
    transferring the layer from the conveying surface of the conveyor onto the support; and
    removing the layer from the support to deposit the layer on the loading surface.

2. The method of claim 1, wherein the extending step includes extending the support when a layer reaches the discharge end of the conveyor.

3. The method of claim 2, wherein the extending step includes extending the support at the same speed the articles are conveyed on the conveying surface.

4. The method of claim 1, wherein the removing step includes withdrawing the support from beneath the layer.

5. The method of claim 4, wherein the withdrawing step includes withdrawing the support generally opposite the direction in which the articles are conveyed.

6. The method of claim 1, including moving the discharge end of the conveyor to another selected discharge elevation after a layer of articles has been loaded on the loading surface.

7. The method of claim 6, wherein the other selected discharge elevation substantially corresponds to the top of a previously-loaded layer of articles.

8. The method of claim 7, wherein the moving step includes moving the discharge end of the conveyor to the selected discharge position by sensing the top of a previously-loaded layer of articles.

9. The method of claim 1, wherein the extending step includes positioning the support substantially parallel to the loading surface independent of the slope of the discharge end of the conveyor.

10. The method of claim 4, wherein the withdrawing step includes maintaining the support substantially parallel to the loading surface independent of the slope of the discharge end of the conveyor.

11. The method of claim 1, wherein the transferring step includes controlling the transfer of the layer from the conveying surface to the support.

12. The method of claim 11, wherein the transfer is controlled by a member pivotally attached to the discharge end of the conveyor.

13. The method of claim 12, wherein the transferring step further includes positioning the member in a substantially vertical direction to halt movement of the layer from the conveying surface to the support.

14. The method of claim 12, wherein the transferring step further includes positioning the member in a bridging position between the conveying surface and the support to facilitate transfer of the layer from the conveying surface to the support.

15. The method of claim 1, wherein the articles are stacked signatures.

16. The method of claim 1, wherein each layer is a greater than 1×1 array of articles.

17. The method of claim 1, wherein the removing step includes pushing the layer of articles from the support.

18. The method of claim 4, wherein the withdrawing step includes preventing the layer of articles from following the support when the support is withdrawn.

19. The method of claim 1, wherein the transferring step includes pushing the layer of articles from the conveyor to the support.

20. The method of claim 1, wherein the loading surface is part of a cart.

21. Apparatus for loading layers of articles on a loading surface, comprising:

a conveyor having a discharge end and a conveying surface;

a support extendible from the discharge end of the conveyor generally in a direction in which the articles are conveyed by the conveying surface for receiving a layer of articles from the conveying surface and positioning the layer on the loading surface; and means for removing the layer of articles from the support to deposit the layer of articles on the loading surface.

22. The apparatus of claim 21, including control means for positioning the discharge end of the conveyor in the vertical direction.

23. The apparatus of claim 22, wherein the control means elevates the discharge end of the conveyor to a position corresponding to the top of a previously-loaded layer of articles.

24. The apparatus of claim 21, including means for maintaining the support substantially parallel to the loading surface when the support is extended.

25. The apparatus of claim 21, including means for positioning the support substantially parallel to the loading surface as the support is being extended.

26. The apparatus of claim 25, wherein the positioning means includes a track for controlling movement of the support relative to the conveying surface of the conveyor and a cam follower engaging a cam surface of the track for tilting the support relative to the conveying surface of the conveyor.

27. The apparatus of claim 24, wherein the maintaining means includes a track for controlling movement of the support relative to the conveying surface of the conveyor and a cam follower engaging a cam surface of the track for tilting the support relative to the conveying surface of the conveyor.

28. The apparatus of claim 26, wherein the positioning means includes a fluid cylinder attached to the conveyor for controlling the movement of the cam follower.

29. The apparatus of claim 27, wherein the maintaining means includes a fluid cylinder attached to the conveyor for controlling the movement of the cam follower.

30. The apparatus of claim 21, wherein the removing means includes means for withdrawing the support from beneath the layer of articles.

31. The apparatus of claim 21, including means for extending the support when a layer reaches the discharge end of the conveyor.

32. The apparatus of claim 31, wherein the extending means extends the support at the same speed the articles are conveyed on the conveying surface.

33. The apparatus of claim 21, including means, proximate to the discharge end of the conveyor, for controlling the transfer of the layer from the conveying surface to the support.

34. The apparatus of claim 33, wherein the layer controlling means is movable between a blocking position for preventing movement of layers onto the support and a bridging position for facilitating transfer of the layers from the conveying surface to the support.

35. The apparatus of claim 34, wherein the layer controlling means includes a member attached to the discharge end of the conveyor and pivotal between a vertical blocking position and a generally horizontal bridging position.

36. The apparatus of claim 21, wherein the articles are stacked signatures.

37. The apparatus of claim 21, wherein each layer is a greater than $1 \times 1$ array of articles.

38. The apparatus of claim 21, including a pusher for pushing the layer of articles from the support.

39. The apparatus of claim 21, including a pusher for pushing the layer of articles from the conveying surface of the conveyor to the support.

40. The apparatus of claim 21, including means for preventing the layer of articles from following the support when the support is withdrawn.

41. The apparatus of claim 22, wherein the control means includes at least one sensor for sensing the top of a previously-loaded layer of articles.

42. The apparatus of claim 41 wherein the control means includes a pair of sensors on the support.

43. Apparatus for loading layers of articles on a loading surface, comprising:

a variably inclined conveyor having a discharge end and a conveying surface;

a support extendible from the discharge end of the conveyor for receiving a layer of articles from the conveying surface and positioning the layer on the loading surface;

means for positioning the support substantially parallel to the loading surface independent of the slope of the discharge end of the conveyor; and means for removing the layer of articles from the support to deposit the layer of articles on the loading surface.

44. A method of loading layers of articles on a loading surface, comprising the steps of:

positioning a discharge end of a variably inclined conveyor at a selected discharge elevation;

conveying a layer of articles on a conveying surface of the conveyor to the discharge end;

extending a support from the discharge end of the conveyor;

positioning the support substantially parallel to the loading surface independent of the slope of the discharge end of the conveyor;

transferring the layer from the conveying surface of the conveyor onto the support; and removing the layer from the support to deposit the layer on the loading surface.

* * * * *